April 16, 1929.  W. H. CLINTON  1,709,657
COFFEE URN FLUSHING DEVICE
Original Filed May 13, 1927  2 Sheets-Sheet 1
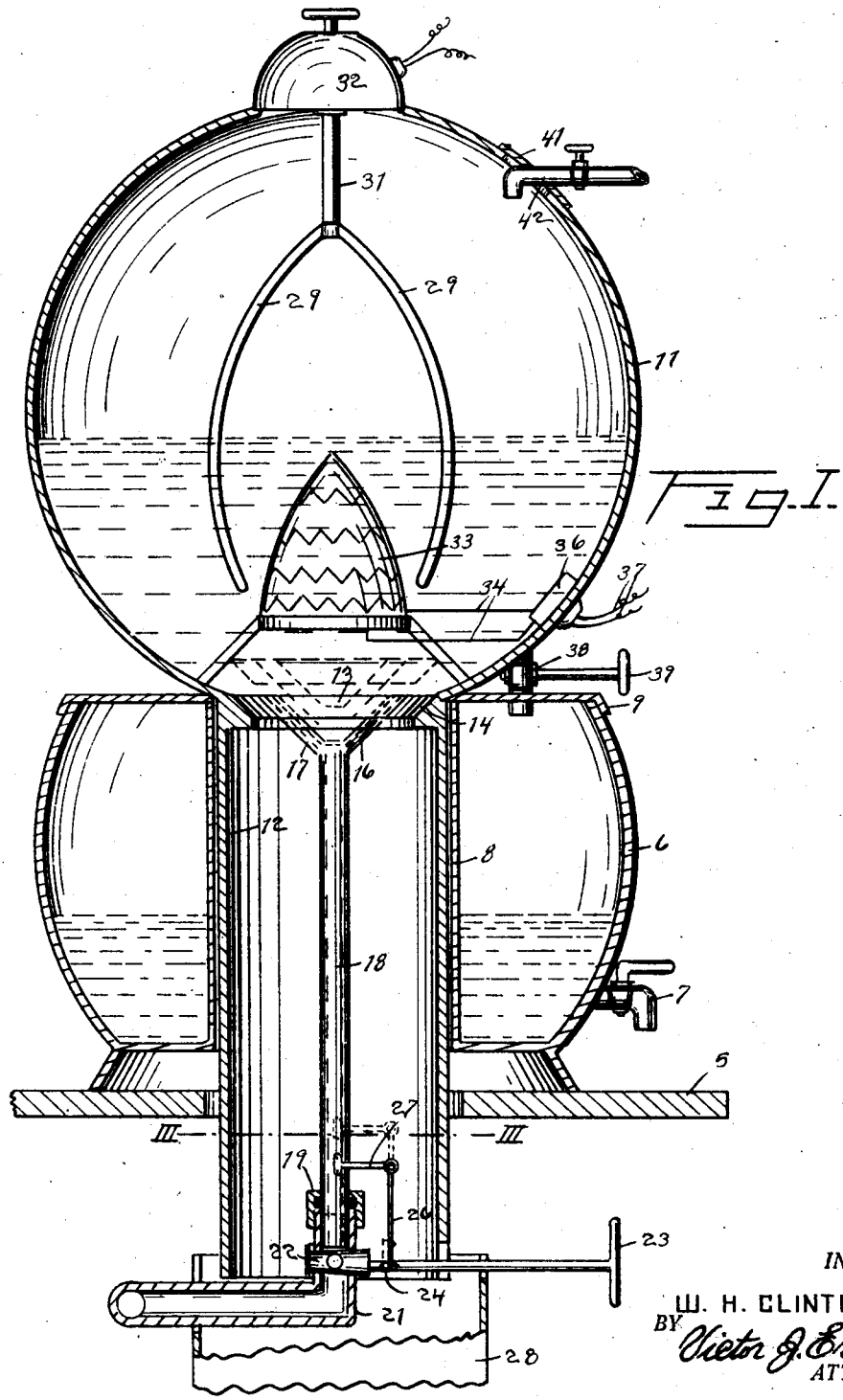
Fig. I.
INVENTOR.
W. H. CLINTON
BY
*Victor J. Evans*
ATTORNEY April 16, 1929.  W. H. CLINTON  1,709,657
COFFEE URN FLUSHING DEVICE
Original Filed May 13, 1927    2 Sheets-Sheet 2
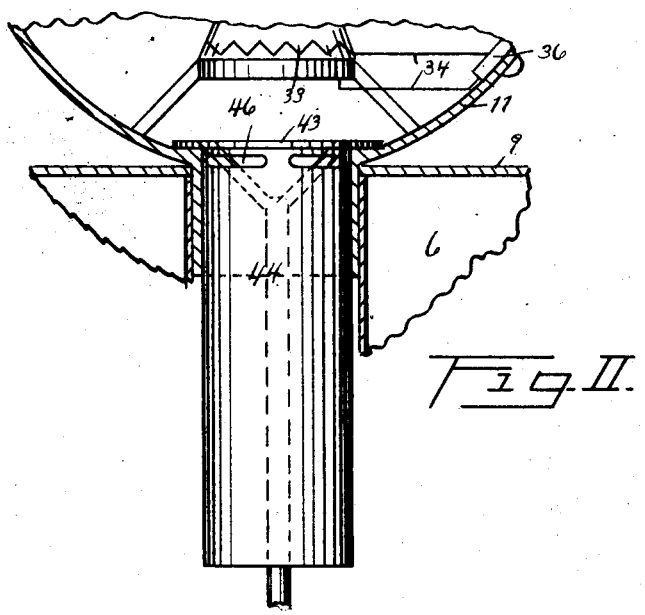
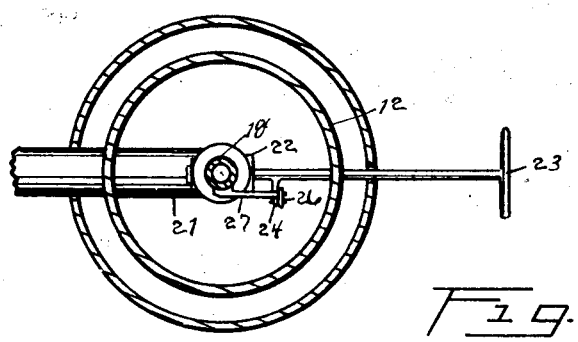
INVENTOR.
W. H. CLINTON
BY
ATTORNEY.

Patented Apr. 16, 1929.

1,709,657

UNITED STATES PATENT OFFICE.

WILLIAM H. CLINTON, OF BURLINGAME, CALIFORNIA.

COFFEE-URN-FLUSHING DEVICE.

Application filed May 13, 1927, Serial No. 191,158. Renewed June 22, 1928.

This invention relates to improvements in flushing means for coffee boilers.

The principal object of this invention is to provide means for flushing the interior of a coffee boiler, for the purpose of cleaning the same and disposing of the grounds incident to the boiling of the coffee.

Another object of my invention is to provide simple means for accomplishing this purpose.

A further object of this invention is to provide a device which is simple in construction, neat in appearance, and economical to manufacture.

A still further object is to provide a device whereby the coffee grounds will be disposed of in such a manner that they will not clog the apparatus.

Other objects and advantages will be apparent during the course of the following description.

In the accompanying drawings forming a part of this specification, and in which like numerals are employed to designate like parts throughout the same, Figure I is a vertical cross-section of my device, Figure II is a fragmentary detail view showing the modified form of flushing valve, and Figure III is a cross-section taken on the line 3—3 of Figure I.

A common method of making coffee is to place the coffee in a bag and to then pour hot water through the coffee so positioned. The resultant fusion is then maintained at a desired temperature in the coffee urn. This method necessitates the frequent change of the cloth bag and at the same time is conducive of a structure which is very difficult to clean.

The average coffee urn found in restaurants and the like, is seldom efficiently cleaned due to its constant use. I have therefore provided a coffee making device wherein the made coffee may be withdrawn to a second receptacle, after which the interior of the first receptacle in which the coffee is made, may be thoroughly cleaned previous to making subsequent coffee.

In the accompanying drawings wherein for the purpose of illustration is shown a preferred example of my invention, the numeral 5 designates a counter upon which a receptacle 6 is positioned. This receptacle is adapted to have previously made coffee fusion placed therein, which fusion may be drawn off for the purpose of serving through a faucet 7.

The receptacle 6 is provided with a hollow tubular member 8 and a removable sectional cover 9.

At 11, I have shown a second receptacle into which ground coffee and water may be placed for the purpose of making the coffee fusion. This receptacle 11 has formed integral therewith a tubular extension 12 which extends downwardly through the tubular member 8 and to a point below the counter 5.

The numeral 13 designates a valve which rests upon a valve seat 14 formed adjacent the juncture between the receptacle 11 and the tubular portion 12. This valve 13 is carried upon the forked extremities 16 and 17 of a pipe 18. The forked extremities 16 and 17 form jets as will be later seen. The pipe 18 passes through a stuffing box 19 which is formed upon the end of a pipe 21 which is connected to the ordinary water pipes of the building in which the device is located.

A valve 22 is positioned within the pipe 21 and is rotated through the medium of a handle 23. This handle has an offset lever 24 which is connected by a link 26 to an arm 27 secured to the pipe 18.

The result of this construction is that when the handle 23 is turned, water from the pipe 21 will pass through the valve 22 and through the pipe 18 to the jets 16 and 17. As these jets extend through the valve 13, the water issuing therefrom will forcibly contact the sides of the receptacle 11. At the same time, the turning of the handle 23 will cause the pipe 18 to move upwardly through the action of the offset lever 24, link 26 and arm 27. Consequently, the valve 13 will be raised to the dotted line position of Figure I.

This opening of the valve will permit any liquid within the vessel to be discharged into the tubular member 12, from which point it will empty into a refuse can 28.

At 29, I have shown agitator arms which are carried upon a shaft 31, which shaft is adapted to be driven by a motor 32. This motor may be operated in any convenient manner, as by electricity or a spring.

In order to heat the liquid within the receptacle 11, I provide a heating element 33 which is connected by wires 34 to a thermostat 36, which thermostat is connected by wires 37 to any suitable source of electrical energy.

At 38, I have shown a draw-off valve which is operated by a handle 39, the purpose of which is to draw off the coffee fusion into the receptacle 6.

The numeral 41 designates a hinged door through which a faucet 42 extends. This hinged door permits the coffee grounds to be placed within the receptacle and also permits the water necessary for the fusion, to be placed therein.

It is therefore apparent that by placing water and coffee grounds within the receptacle 11, and by rotating the arms 29 the entire mixture will receive an even cooking by means of the heat derived from the heating element 33.

When the coffee fusion has been completed, the same is drawn off into the lower receptacle and then by operating the handle 33, the flushing action will take place as before described, thus leaving an absolutely clean receptacle in which further coffee fusions may be made.

In the modified form shown in Figure II, the same construction is employed with the exception that a flat valve is used as indicated at 43, which is positioned upon a tubular member 44 having drainage slots 46 therein. These slots are of ample size to accommodate the coffee grounds.

It is to be understood that the forms of my invention, herewith shown and described are to be taken as preferred examples of the same, and that various changes relative to the shape, material, size and arrangement of parts may be resorted to without departing from the spirit of the invention or the scope of the subjoined claims.

Having thus described my invention, I claim:—

1. In a flushing device of the character described, a receptacle, a tubular portion secured to said receptacle, a valve seat formed at the juncture of said receptacle and said tubular portion, a valve adapted to rest upon said seat, diverging pipes extending through said valve and forming jets, a pipe extending downwardly from said valve and communicating to said diverging pipes, a supply pipe slidably connected to said last mentioned pipe, a valve positioned within said supply pipe, means for simultaneously rotating said valve in said supply pipe, and raising said first mentioned valve from its seat.

2. In a flushing device, a receptacle having downwardly extending tubular portion, a valve interposed between said receptacle and said tubular portion, a pipe extending through said valve so as to form a nozzle, a vertically disposed pipe secured to said last mentioned pipe, a supply pipe slidably secured to said downwardly extending pipe and communicating therewith, a valve rotatably positioned in said supply pipe, a handle for rotating said valve, an offset lever formed on said handle, a link secured to said lever, an arm secured to said downwardly extending pipe and to said link, for the purpose specified.

In testimony whereof I affix my signature.

WILLIAM H. CLINTON.